United States Patent
Dougherty et al.

(10) Patent No.: US 6,439,459 B1
(45) Date of Patent: Aug. 27, 2002

(54) METHODS AND SYSTEMS FOR PROVIDING HUMAN/COMPUTER INTERFACES

(75) Inventors: Thomas J. Dougherty, Los Altos; S. Joy Mountford, Mountain View; Jesse L. Dorogusker, Menlo Park; James H. Boyden, Los Altos Hills; Philip A. van Allen; Daniel E. Cummings, both of San Francisco, all of CA (US); Brygg A. Ullmer, Cambridge, MA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/721,032

(22) Filed: Nov. 24, 2000

Related U.S. Application Data

(63) Continuation of application No. 08/948,891, filed on Oct. 10, 1997, now Pat. No. 6,076,734, and a continuation-in-part of application No. 08/946,327, filed on Oct. 7, 1997.
(60) Provisional application No. 60/061,310, filed on Oct. 7, 1997.

(51) Int. Cl.[7] .................................................. G06K 7/10
(52) U.S. Cl. .................................. 235/462.01; 235/375
(58) Field of Search .................................. 235/375, 379, 235/494, 462.01, 462.02, 462.27–462.35, 456, 472.01, 472.02, 381, 492

(56) References Cited

U.S. PATENT DOCUMENTS

| | | | | |
|---|---|---|---|---|
| 3,806,706 A | * | 4/1974 | Hasslinger et al. | 235/61.11 |
| 3,818,500 A | * | 6/1974 | Lemelson | 360/2 |
| 3,891,829 A | * | 6/1975 | Bobras | 235/462.04 |

(List continued on next page.)

FOREIGN PATENT DOCUMENTS

| | | | |
|---|---|---|---|
| JP | 356161734 A | * | 12/1981 |
| JP | 07108786 | | 4/1995 |
| JP | 07093567 A | | 9/1995 |

(List continued on next page.)

OTHER PUBLICATIONS

US 20010031640A1—PGPUB Document, Waller et al.; Oct. 18, 2001.*
"DOI System Specification," Mar. 31, 1997, www.doi.org/system_spec.html.
TVI Press Release, "New TVIQ™ Touch&View™ Technology Launched on NTT/Dome PC Karaoke CD–ROM," Jul. 27, 1996.

(List continued on next page.)

*Primary Examiner*—Thien M. Le
(74) *Attorney, Agent, or Firm*—Van Pelt & Yi LLP

(57) ABSTRACT

The present invention teaches a variety of methods and systems for providing computer/human interfaces. According to one method, the user interfaces with an electronic device such as a computer system by engaging a sensor with desired regions of an encoded physical medium. The encoded physical medium is preferably chosen to provide intuitive meaning to the user, and is thus an improved metaphor for interfacing with the computer system. Suitable examples of the encoded physical medium include a data-linked book, magazine, globe, or article of clothing. Some or all of the selected regions have had certain information encoded therein, information suitable for interfacing and controlling the computer system. When the user engages the sensor with a region having certain encoded information, the certain encoded information is interpreted and an appropriate action taken. For example, the sensor or the computer system may provide suitable feedback to the user. The encoded physical medium may have text and/or graphic illustrations that draw the user in or provide meaningful clues or instructions perhaps related to the encoded information. The sensor may have at least one identification number (ID) providing information such as user identity, sensor type, access type, or language type. The sensor can transmit the certain decoded information together with the at least one ID to the computer system.

19 Claims, 7 Drawing Sheets

U.S. PATENT DOCUMENTS

| | | | |
|---|---|---|---|
| 3,894,756 A | * 7/1975 | Ward | 356/418 |
| 4,074,853 A | * 2/1978 | Flint | 235/477 |
| 4,131,367 A | 12/1978 | French et al. | 356/405 |
| 4,325,083 A | 4/1982 | Rouchon et al. | 358/228 |
| 4,345,011 A | 8/1982 | Drexhage | 430/7 |
| 4,414,635 A | 11/1983 | Gast et al. | 364/526 |
| 4,488,679 A | 12/1984 | Bockholt | |
| 4,547,074 A | 10/1985 | Hinoda et al. | 356/405 |
| 4,597,495 A | 7/1986 | Knosby | 209/3.3 |
| 4,679,068 A | 7/1987 | Lillquist et al. | 358/44 |
| 4,751,571 A | 6/1988 | Lillquist | 358/113 |
| 4,855,725 A | 8/1989 | Fernandez | 340/706 |
| 4,917,500 A | 4/1990 | Lugos | 356/406 |
| 4,965,449 A | 10/1990 | Suzuki et al. | 250/226 |
| 4,990,092 A | 2/1991 | Cummings | 434/317 |
| 4,998,010 A | 3/1991 | Gordon et al. | |
| 5,047,614 A | 9/1991 | Bianco | |
| 5,059,126 A | 10/1991 | Kimball | 434/308 |
| 5,202,828 A | 4/1993 | Vertelney et al. | 364/419 |
| 5,229,841 A | 7/1993 | Taranowski et al. | 356/406 |
| 5,298,731 A | 3/1994 | Ett | |
| 5,303,388 A | 4/1994 | Kreitman et al. | 395/159 |
| 5,337,358 A | 8/1994 | Axelrod et al. | |
| 5,339,095 A | 8/1994 | Redford | 345/158 |
| 5,341,293 A | 8/1994 | Vertelney et al. | 364/419.17 |
| 5,367,148 A | 11/1994 | Storch | |
| 5,385,803 A | 1/1995 | Duff et al. | |
| 5,413,486 A | 5/1995 | Burrows et al. | 434/317 |
| 5,437,552 A | 8/1995 | Baer et al. | 434/317 |
| 5,452,414 A | 9/1995 | Rosendahl et al. | 395/159 |
| 5,459,489 A | 10/1995 | Redford | 345/179 |
| 5,461,711 A | 10/1995 | Wang et al. | 395/161 |
| 5,466,158 A | 11/1995 | Smith, III | 434/317 |
| 5,484,292 A | 1/1996 | McTaggart | 434/317 |
| 5,486,686 A | 1/1996 | Zdybel, Jr. et al. | |
| 5,523,552 A | 6/1996 | Shellhammer et al. | 235/462 |
| 5,525,798 A | 6/1996 | Berson et al. | |
| 5,537,336 A | 7/1996 | Joyce | |
| 5,545,883 A | 8/1996 | Sasou et al. | |
| 5,569,549 A | 10/1996 | Redford | 429/1 |
| 5,572,643 A | 11/1996 | Judson | |
| 5,586,216 A | 12/1996 | Degen et al. | 395/2.85 |
| 5,587,784 A | 12/1996 | Pines et al. | 356/4.01 |
| 5,592,561 A | 1/1997 | Moore | |
| 5,597,307 A | 1/1997 | Redford et al. | 434/118 |
| 5,600,115 A | 2/1997 | Balzano | |
| 5,604,516 A | 2/1997 | Herrod et al. | 345/156 |
| 5,624,265 A | 4/1997 | Redford et al. | 434/307 |
| 5,631,686 A | 5/1997 | Castelli et al. | |
| 5,640,193 A | 6/1997 | Wellner | |
| 5,650,608 A | 7/1997 | Redford et al. | 250/210 |
| 5,684,885 A | 11/1997 | Cass et al. | |
| 5,691,527 A | 11/1997 | Hara et al. | |
| 5,693,693 A | 12/1997 | Auslander et al. | 524/88 |
| 5,694,102 A | 12/1997 | Hecht | |
| 5,726,435 A | 3/1998 | Hara et al. | |
| 5,729,251 A | 3/1998 | Nakashima | 345/156 |
| 5,739,814 A | 4/1998 | Ohara et al. | 345/156 |
| 5,777,309 A | 7/1998 | Malsev et al. | |
| 5,801,067 A | 9/1998 | Shaw et al. | 438/15 |
| 5,804,803 A | 9/1998 | Cragun et al. | |
| 5,814,806 A | 9/1998 | Tanaka et al. | 235/494 |
| 5,832,119 A | 11/1998 | Rhoads | 382/232 |
| 5,841,978 A | 11/1998 | Rhoads | |
| 5,848,413 A | 12/1998 | Wolff | |
| 5,862,321 A | 1/1999 | Lamming et al. | |
| 5,862,429 A | 1/1999 | Ueno et al. | |
| 5,866,895 A | 2/1999 | Fakuda et al. | |
| 5,869,819 A | 2/1999 | Knowles et al. | 235/462 |
| 5,886,337 A | 3/1999 | Rockstein et al. | 235/462 |
| 5,897,669 A | 4/1999 | Matsui | |
| 5,898,166 A | 4/1999 | Fakuda et al. | |
| 5,903,729 A | 5/1999 | Reber et al. | 395/200.49 |
| 5,925,871 A | 7/1999 | Knowles et al. | 235/462.45 |
| 5,932,870 A | 8/1999 | Berson | 235/494 |
| 5,936,228 A | 8/1999 | Yoshihara | |
| 5,959,296 A | 9/1999 | Cyr | |
| 6,032,861 A | 3/2000 | Lemelsone et al. | |
| 6,076,734 A | * 6/2000 | Dougherty et al. | 235/462.01 |
| 6,081,827 A | 6/2000 | Reber et al. | 709/200 |
| 6,164,541 A | * 12/2000 | Dougherty et al. | 235/462.01 |
| 6,256,638 B1 | 7/2001 | Dougherty et al. | 707/104 |

FOREIGN PATENT DOCUMENTS

| | | | |
|---|---|---|---|
| JP | 09204389 | | 8/1997 |
| JP | 410013789 A | * | 1/1998 |
| JP | 10171758 | | 6/1998 |
| JP | 02000166857 A | * | 6/2000 |
| WO | 9216913 A | | 10/1992 |
| WO | WO96/01464 | | 1/1996 |
| WO | WO9603736 A1 | | 2/1996 |
| WO | WO96/19795 | | 6/1996 |
| WO | WO96/19821 | | 6/1996 |
| WO | WO96/29749 | | 9/1996 |
| WO | WO 97/01137 | | 1/1997 |
| WO | WO97/02552 | | 1/1997 |
| WO | WO 97/32262 | | 9/1997 |
| WO | WO 98/03923 | | 1/1998 |
| WO | 98/03923 A1 | | 1/1998 |

OTHER PUBLICATIONS

TVI Press Release, "NTT Partnership with TV Interactive Corporation," Mar. 4, 1996.

Gorbet, Matthew G., Orth, Maggie and Ishii, Hiroshi, "Triangles "Tangible Interface for Manipulation and Exploration of Digital Information Topography, Nov. 1, 1998, Triangles CHI98.

Bar Code Hotel, Nov. 1, 1998.

Poynor, Rick, "The Hand that Rocks the Cradle", May Jun. 1995, I.D.

Ishii, Hiroshi and Ullmer, Brygg, "Tangible Bits: Towards Seamless Interfaces between People, Bits and Atoms", Mar. 22–27, 1997, CHI.

Gorbet, Matthew G, Orth, Maggie and Ishii, Hiroshi, "Triangles: Tangible Interface for Manipulation and Exploration of Digital Information Topography", Apr. 18–23, 1998, CHI98.

Portable Self–Checkout Retail System; IBM Technical Disclosure Bulletin; vol. 35 No. 1A; Jun. 1992.

Netscape Quick Tour; Accessing & Navigating the Internet's World Wide Web; 1995.

* cited by examiner

METHODS AND SYSTEMS FOR PROVIDING HUMAN/COMPUTER INTERFACES

CROSS-REFERENCE TO RELATED APPLICATION

This is a Continuation application of prior application Ser. No. 08/948,891 filed on Oct. 10, 1997 now U.S. Pat. No. 6,076,734, which designated the United States the disclosure of which is incorporated herein by reference.

This application is, a continuation-in-art of Dougherty et al.'s U.S. patent application Ser. No. 08/946,327, filed Oct. 7, 1997, which is incorporated herein in its entirety. This application is also related to van Allen et al.'s provisional U.S. patent application Ser. No. 60/061,310, filed Oct. 7, 1997, which is incorporated herein in its entirety.

BACKGROUND OF THE INVENTION

This invention relates generally to computer interfaces. More specifically, the present invention discloses a variety of computer interfaces using encoded physical mediums wherein an encoded region may include a marker indicating that information is encoded therein. The present invention also teaches data-linked physical mediums that provide users intuitive access to multimedia information that may be stored remotely.

People are constantly interacting with computerized systems, from the trivial (e.g., the computerized toaster or the remote control television) to the exceedingly complex (e.g., telecommunications systems and the Internet). An advantage of computerization is that such systems provide flexibility and power to their users. However, the price that must be paid for this power and flexibility is, typically, an increase in the difficulty of the human/machine interface.

A fundamental reason for this problem is that computers operate on principles based on the abstract concepts of mathematics and logic, while humans tend to think in a more spatial manner. Often people are more comfortable with physical, three-dimensional objects than they are with the abstractions of the computer world. In short, the power and flexibility provided by the computer and related electronic technology are inherently limited by the ability of the human user to control these devices. Since people do not think like computers, metaphors are adopted to permit people to communicate effectively with computers. In general, better metaphors permit more efficient and medium independent communications between people and computers. The better metaphor will provide the user a natural and intuitive interface with the computer without sacrificing the computer's potential.

There are, of course, a number of computer interfaces which allow users, with varying degrees of comfort and ease, to interact with computers. For example, keyboards, computer mice, joysticks, etc. allow users to physically manipulate a three-dimensional object to create an input into a computer system. However, these computer interfaces are quite artificial in nature, and tend to require a substantial investment in training to be used efficiently.

Progress has been made in improving the computer interface with the graphical user interface (GUI). With a GUI, icons that represent physical objects are displayed on a computer screen. For example, a document file may look like a page of a document, a directory file might look like a file folder, and an icon of a trash can may be used for disposing of documents and files. In other words, GUIs use "metaphors" where a graphical icon represents a physical object familiar to users. This makes GUIs easier for most people to use. GUIs were pioneered at such places as Xerox PARC of Palo Alto, Calif. and Apple Computer, Inc. of Cupertino, Calif. The GUI is also commonly used with UNIX™ based systems, and is rapidly becoming a standard in the PC/MS-DOS world with the Windows™ operating system provided by Microsoft Corporation of Redmond, Wash.

While GUIs are a major advance in computer interfaces, they nonetheless present a user with a learning curve due to their still limited metaphor. In other words, an icon can only represent a physical object; it is not itself a physical object. It would be ideal if the computer interface was embodied in a physical medium which could convey a familiar meaning, one perhaps relevant to the task at hand. While progress has been made towards achieving such a oal, many roadblocks yet remain. For example, assuming that for a given application one has selected a physical medium for use as a computer interface, the information necessary to support the computer interface must still be encoded within the physical medium. Additionally, techniques must be developed for linking such interfaces with the vast wealth of information available from remote sources using computer networks like the Internet. Redford et al.'s U.S. Pat. No. 5,634,265, entitled "PRINTED PUBLICATION REMOTE CONTROL FOR ACCESSING INTERACTIVE MEDIA," filed Jul. 1, 1994, describes one rudimentary mechanism for encoding information within a physical medium. Redford describes the use of a printed publication such as a book being constructed to include a storage media, a data button, and remote control circuitry. The button is physically attached to the printed publication and when activated by a user, data from the storage media can initiate local feedback at the printed publication and the remote control can transmit a control message to a remote computer system which in turn performs some desired operation.

While strides have been made in attempting to improve computer interfaces, there is still progress to be made in this field. Ultimately, the interface itself should disappear from the conscious thought of users so that they can intuitively accomplish their goals without concern to the mechanics of the interface or the underlying operation of the computerized system.

SUMMARY OF THE INVENTION

The present invention improves the human/computer interface by providing a method for interfacing via an encoded physical medium having a region wherein information has been encoded. The interface method includes measuring information present in a first region of the encoded physical medium and then determining whether the measured information contains a marker indicating that certain information has been encoded therein. According to one embodiment, the marker is capable of generating light within a particular range of electromagnetic wavelengths, either by reflection or through luminescence. When the marker is reflective, the sensor typically includes a light emitting element and a sensing element. However, when the marker and the encoded region are luminescent, the sensor need only include a sensing element.

In related embodiments of the present invention, the information may be encoded according to a spectral encoding scheme, a bar code scheme, or a combination thereof. The marker may be infrared ink applied over the certain encoded information, regardless of how the certain information is encoded.

The present invention also teaches that when it is determined that the marker is present in the first region, the certain encoded information is translated into certain decoded information including a function to be performed by the computer system. The function to be performed by the computer system may include, among other things, providing visual, audio, and/or tactile feedback. The certain decoded information could also include a uniform resource locator (URL) and the function may involve the computer system accessing and/or displaying an Internet web page to which the URL directs.

The present invention further teaches maintaining a database tracking the results of the user engaging the sensor with a plurality of regions, including the determination of null meaning region, i.e., regions that do not contain a marker. The database could then be used later to determine whether a specific condition (such as collection of a fixed number of clues or data points) has been satisfied. In turn, a specified action could be performed by the sensor or the computer system.

The present invention further improves upon the human/computer interface by teaching a method for creating an encoded physical medium having a region with encoded content. The method requires receiving content that is to be encoded into a desired location on the encoded physical medium, encoding the content according to a particular encoding scheme suitable for application onto the encoded physical medium, and inserting the encoded content together with a marker into a corresponding desired location within a representation of the encoded physical medium. The marker indicates that the content is encoded within the corresponding desired location, thereby enabling a subsequently engaged sensor to determine the existence of the content. Once the representation is created, the present invention further teaches that the encoded physical medium may be created from the representation.

According to a related aspect of the present invention, the step of encoding the content together with the marker includes generating a binary number that represents the content and encoding the binary number that represents the content according to a spectral encoding scheme. In some related embodimenits, the marker represents ink that reflects light from within a particular range of electromagnetic wavelengths. Of course, the present invention also teaches that text and graphics may be designed within the representation of the encoded physical medium. Additionally, the encoded physical medium may be created directly, rather than first creating a representation using a computer system or other such tool.

One separate embodiment of the present invention teaches a computer interface between a user and a computer system using an encoded physical medium. The encoded physical medium is suitable for having at least one region wherein information has been encoded. The computer interface includes a sensor operable for measuring information present on the encoded physical medium, and a first device coupled to the sensor and responsive to determine whether information measured by the sensor includes a marker indicating that certain encoded information is present in the measured information. In a related embodiment, the computer interface includes a second device responsive to the first device such that when the first device determines the presence of the marker, the second device is operable to decode the certain encoded information present in the measured information. In yet another related embodiment, the computer interface also has a transmitter device operable to transmit the certain decoded information to the computer system.

In still another related embodiment, the marker is operable to generate light from within a particular range of electromagnetic wavelengths. In this embodiment, the sensor has a sensing element responsive to the particular range of electromagnetic wavelengths. By generate light, it is meant that the marker can either reflect and/or emit tight.

In some embodiments, the sensor has an opaque shroud covering the sensing element to protect it from ambient light. In other embodiments, the sensor includes filter circuitry Lo eliminate noise due to the ambient light.

One other separate embodiment of the present invention teaches an encoded physical medium. The encoded physical medium is suitable for use in interfacing a user and a computer system and has a region wherein certain information is encoded. The certain encoded information includes a marker indicating that the certain encoded information is encoded in the first region. The certain encoded information includes data suitable for interpreting into computer readable data. The encoded physical medium may take on a variety of forms such as an article of apparel, packaging material, a book or magazine, and a globe. The certain encoded information may be encoded according to a bar code or spectral encoding scheme, the spectral encoding scheme including encoding colors red, green, and blue, and possibly some colors chosen from the infrared color range.

Still another separate embodiment of the present invention teaches an electronic data linked physical medium suitable for linking, a physical medium with video and audio data stored on multimedia networked computers. Typically, the data linked medium includes a physical medium having at least one hot spot encoded with linking data enabling the data linked physical medium to access remote data, a sensor operable to measure and decode the linking data, and a transmitter operable to transmit the linking data to a remote computer system. The remote computer system is responsive to the linking data to retrieve the remote data and present it to a user of the data linked physical medium. Thus the user of the data linked physical medium is provided a mechanism for linking to and accessing remote data.

Yet another embodiment of the present invention teaches another computer interface for interfacing a user and a computer system using an encoded physical medium having at least one region wherein certain information has been encoded. The computer interface provides a sensor operable for measuring information present on the encoded physical medium. The sensor has at least one identification number (ID) and is operable to transmit the certain decoded information and the at least one ID to the computer system. The at least one ID can correspond to information such as a user identification, a sensor type, access type, or language type.

The present invention therefore provides a more intuitive and richer metaphor for the interaction between humans and computerized systems. These and other advantages of the present invention will become apparent upon reading the following detailed descriptions and studying the various figures of the drawings.

DETAILED DESCRIPTION OF THE PREFERRED EMBODIMENTS

Figure 1:
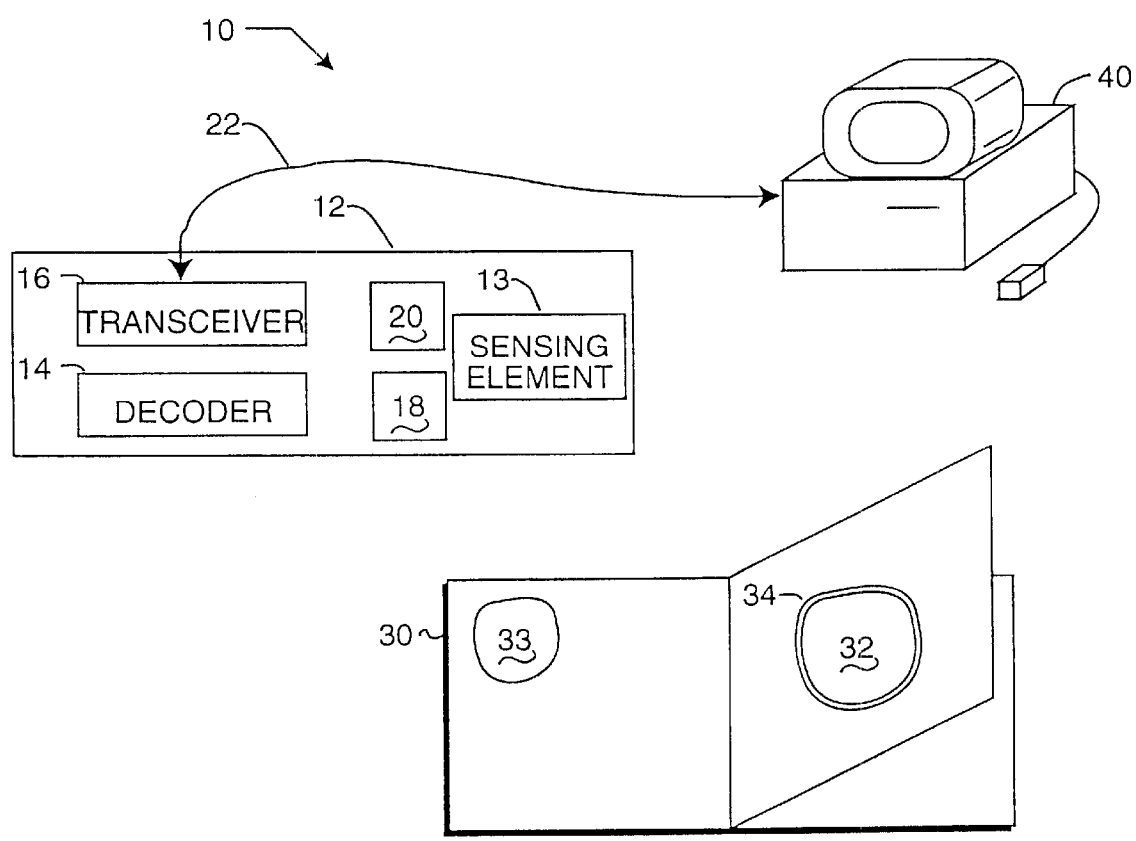
FIG. 1 is a diagrammatic illustration of a computer interface in accordance with one embodiment of the present invention.

With reference to FIG. 1, a computer interface 10 in accordance with one embodiment of the present invention will now be described. The interface 10 includes a sensor 12 and an encoded physical medium 30. As will be apparent, the computer interface 10 provides an intuitive mechanism for a user to interface with and control an electronic device such as a computer system 40 (also illustrated in FIG. 1).

The encoded physical medium 30 has at least one region 32 wherein information has been encoded. The content of the region 32 may be encoded according to a well known content encoding scheme such as a bar code scheme. The present invention also teaches a variety of new encoding schemes. For example, a content encoding scheme contemplated by the present invention is a bar code printed using invisible, e.g. infrared (IR), inks. Such a bar code would be apparent to the sensor but invisible to the user. Alternatively, the content of the region 32 may be encoded according to a spectral encoding scheme. Several specific examples of suitable spectral encoding schemes are described below with reference to FIGS. 4–8. The encoded physical medium 30 may also include a document identification (ID) hotspot 33, similar to the region 32. The content encoded within the document ID hotspot 33 will, however, be special in that it provides an indication of the identity of the particular encoded physical medium 30.

In certain embodiments, encoded regions such as the region 32 further include a marker 34 indicating that certain encoded information is present in the region 32. By way of example, in one spectral encoding scheme, the desired content for the region 32 is represented according to different visible and infrared inks (reflective and/or photoluminescent) applied to the region 32. The marker 34 is represented by yet another infrared ink similarly applied to the region 34. In this example, the user would not see the marker 34, but may or may not see a visual representation of the content encoded in the region 32. Throughout the specification, markers, hotspots, regions, inks, etc., are often described as being able to generate light. Being able to "generate light" is defined herein as including at least one of the ability to reflect or emit light.

The encoded physical medium 30 may take any suitable form. By way of example, the encoded physical medium 30 may be a page from a physical book or magazine, an article of clothing such as a T-shirt, a globe, consumer product packaging, etc. Such encoded physical mediums may have been marked and encoded with data for the specific purpose of providing the interface of the present invention. Alternatively, the encoded physical medium 30 may simply be items selected from a user's surroundings, the encoded information arising randomly or unintentionally (at least with relation to the user's application). In another embodiment, the encoded content arises randomly or unintentionally, but a marker 34 is applied intentionally. Some representative examples of encoded physical mediums are described below with reference to FIGS. 10–11.

The sensor 12 includes a sensing element 13, a decoder 14, a transceiver 16, an on/off switch 18, and memory 20. The sensing element 13 is arranged to measure information present on the encoded physical medium 30. When the utilized encoding scheme implements a marker 34, the decoder 14 is arranged to determine whether the marker 34 is present in measured information, and when the marker 34 is sensed, to decode the measured information. The transceiver 16 is operable to transmit data such as decoded information to the computer system 40. Depending upon the embodiment, the transceiver 16 may establish either a uni-directional or bi-directional communications link 22 between the interface 10 and the computer system 40. The communications link 22 is preferably a wireless communications link such as one based upon infrared (IR), radio-frequency (RF), or ultrasonic communications technology. However, the communications link 22 may take the form of a wired communications link such as a serial RS-232 or RS-485 data cable, or a parallel data cable.

In some embodiments, the sensor 12 operates by measuring information selected from the encoded physical medium 30 by the user, decoding as necessary, and then transmitting the decoded information to the computer system 40 for further processing. In other embodiments, the sensor 12 includes further hardware for processing the measured information locally. For example, the sensor 12 may include a microcontroller such as a PIC microcontroller programmed to process the measured information. The decoder 14 may be part of the microcontroller, or may be separate circuitry. in some embodiments, the sensor 12 maintains in the memory 20 a database related to the measured information. The information stored in the database may be used locally at the sensor and/or saved for subsequent transmission.

The computer system 40 appears in FIG. 1 as a personal desktop computer. However, it is contemplated that the interface 10 is suitable for use with a wide scope of electronic devices. The wide scope of suitable computer systems encompasses all types of personal computers, interactive TV systems, set-top boxes, web interfaces, haptic interfaces, streaming music and video sources, and many others. One particular example is a WebTV "net-top box." Further, although the interface 10 is intended to be representative of and thus generic to a broad range of interfaces contemplated by the present invention, it will be appreciated that computer interfaces of the present invention may take many forms which go beyond the example interface 10 of FIG. 1.

Figure 2:
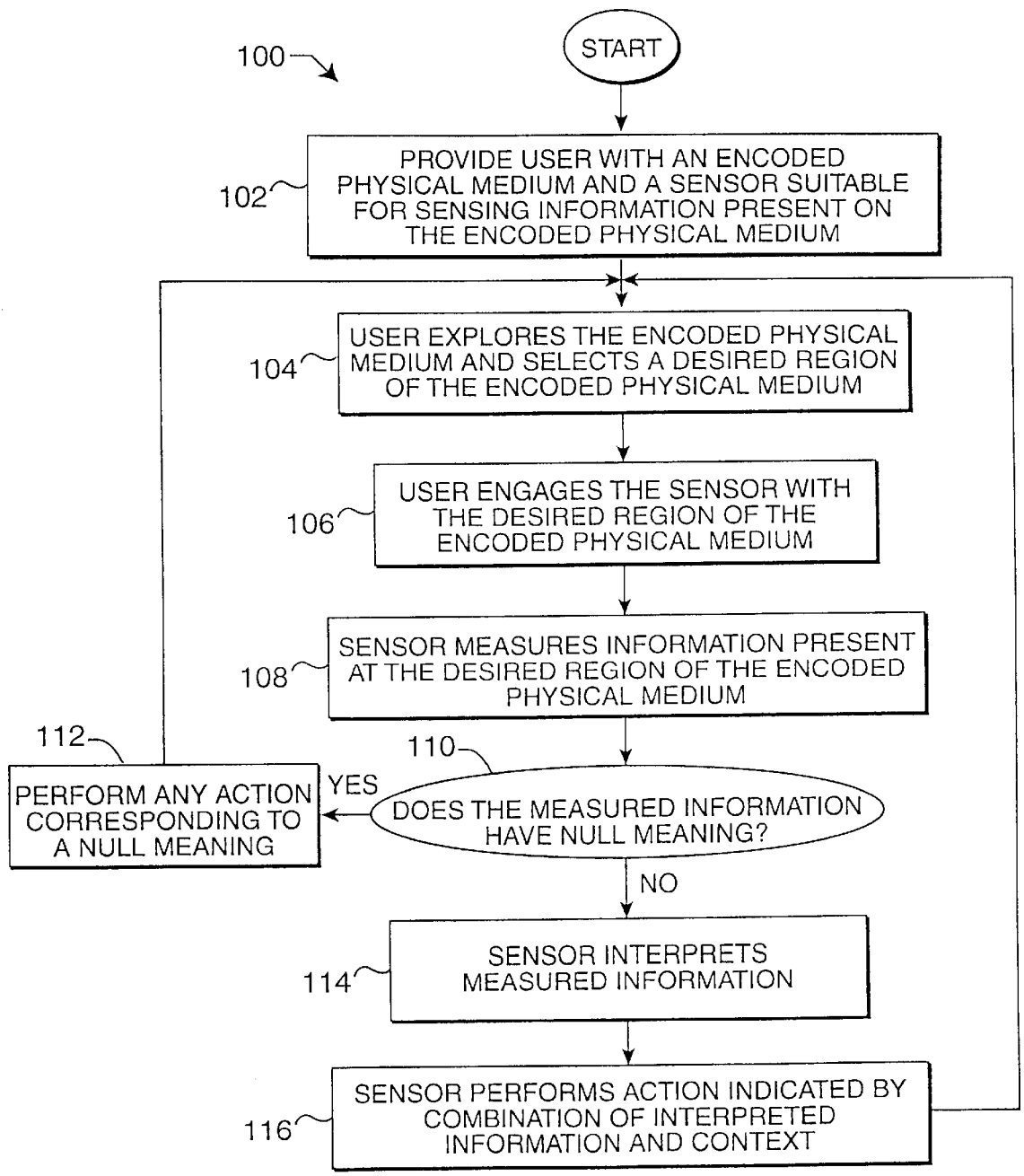
FIG. 2 is a flow chart illustrating one method for providing an interface between a user and a computer system in accordance with one aspect of the present invention.

With reference to FIG. 2, a method 100 for providing an interface between a user and a computer system in accordance with one aspect of the present invention will now be described. An initial step 102 provides the user with an encoded physical medium 30 and a sensor 12 suitable for sensing information present within the encoded physical medium 30. As described above, the encoded physical medium 30 may take any suitable form. One suitable method for performing the step 102 is described in more detail below with reference to FIG. 3.

In a next step 104, the user explores the encoded physical medium 30 and selects a desired portion 32 of the encoded physical medium 30. The user may be drawn into the desired portion 32 through text, coloring, or graphics illustrated on the desired portion 32. The text, coloring or graphics illustrated on the desired portion 32 may represent the encoded information, may be in addition to the encoded information, or may be some suitable combination of illustration and encoded information. Instead of being drawn in, perhaps in the case of al game or work task, the user may be selecting the desired portion 32 based upon some predefined criteria. For example, the user may be searching for a clue to a puzzle game, or simply doing inventory and selecting a bar code found on a product during this process. In any event, once the user has selected the desired portion 32 in step 104, in a step 106 the user engages the sensor 12 with the desired portion 32 of the encoded physical medium 30. The sensor engagement of step 106 will typically involve the user setting the sensor 12 to an ON state that indicates that the sensor 12 should be in operation. In the case of the interface 10 of FIG. 1, the step 106 would involve operation of the on/off switch 18. Depending upon the particular sensor and the application, sensor engagement may require the user to bring the sensor 12 into close proximity to or in contact with the desired region 32.

In a next step 108, the sensor 12 measures information present within the desired region 32 of the encoded physical medium 30. Information is defined herein as any data that the sensor 12 is capable of measuring. Thus, the information measured by the sensor 12 is not limited to information that has been purposefully encoded into the desired region 32 of the encoded physical medium 30.

A step 110 then determines whether the measured information has null meaning. When step 110 determines that the measured information has null meaning, it is simply determining that the measured information has not been marked, for the present purposes, as containing encoded information. However, as will be appreciated, a determination of null meaning may be consequential. Accordingly, when step 110 determines that the measured information has null meaning, a step 112 performs any action indicated by such a determination. For example, the sensor 12 may be equipped with a light that blinks or a buzzer that sounds when the measured information has null meaning. As another example, the sensor 12 may have memory 20 that is utilized to keep track of the meaning of the different measured regions, including each null determination. Alternatively, the null information may be transmitted to the computer system 40. In any event, once step 112 is complete, the control of the method 100 is passed back to step 104 allowing the user to explore further and select another region 32 for sensing.

When it is determined in step 110 that the information measured in step 108 does not have null meaning (e.g., the measured information has been marked as containing encoded information), control is passed to a step 114 wherein the sensor 12 interprets the measured information. Depending upon the specific application, step 114 may involve just decoding of the information from the particular encoding scheme into a data format suitable for transmission by the transceiver 16. However, in some embodiments significant processing of the measured information will occur locally at the sensor 12. Thus in a next step 116, the sensor 12 performs an operation that is a function of both the information interpreted in the step 114 and the context in which the information was measured. Note that context depends upon the particular application and may include the nature of previously interpreted information, the timing of the user's engagement of the sensor 12, information received at the sensor from the computer system 40, etc.

For example, with each new engagement of the sensor 12, the sensor 12 may store the interpreted information in a database in the memory 20 and then evaluate the database or a portion of it to determine whether a predefined condition has been satisfied. A predefined condition could be the user gathering a set number of clues or data points, at which point the sensor transmits all or some of the stored information to the computer system 40. In one specific example, the user may be perusing an encoded catalog magazine 30 with a hand-held wand sensor 12. As the user engages the wand sensor 12 with regions of the catalog 30 representing desired products, these regions are sensed and the information therein interpreted by the wand sensor 12. When finished, the user may select an order region 32 indicating to the sensor that the user is ready to order and purchase the selected items. At this point, the communication link 22 could be established with the computer system 40, which may be local or remote, and the user's order information could be transmitted to the computer system 40 which in turn could process the order or further transmit the order as necessary.

In other embodiments, the indicated action of step 116 includes the computer system 40 and/or the sensor 12 responding to the measured information by providing feedback. The feedback could take any suitable form such as audio, visual or tactile feedback. In any event, once the indicated action has been performed in the step 116, the control of the method 100 is passed back to step 104 allowing the user to further explore the encoded physical medium 30 and select other regions for sensing.

As noted above with reference to FIG. 1, certain encoded physical mediums 30 include a document ID hot spot 33. In these embodiments, when a user first begins exploring the encoded physical medium 30 as described in step 104, the initial step 106 ought to be the engagement of the sensor 12 with the document ID hot spot 33. Then in steps 114–116, the sensor 12 could store the document ID for later use, or immediately transmit it to the computer system, or both; it depends upon the specific application. For example, it is contemplated that the sensor 12 store the document ID and include it with content decoded from each subsequently measured region prior to further processing of the decoded content.

Further, certain encoding schemes may not require the use of a marker. Within these schemes, steps 110 and 112 of FIG. 2 would become unnecessary, and thus another method for providing an interface using an encoding scheme without a marker could be implemented by simply skipping directly from step 108 to step 114 of FIG. 2.

Figure 3:
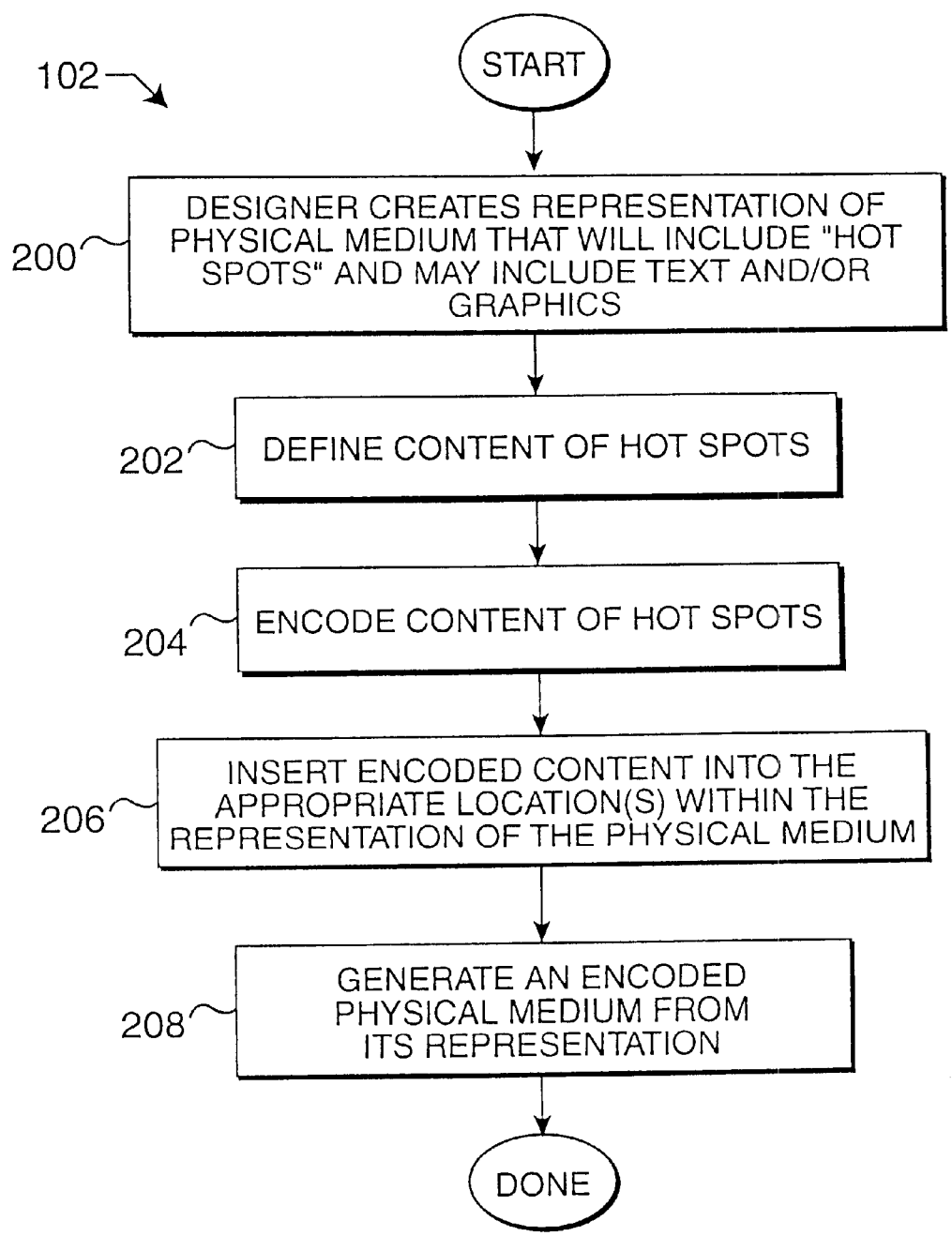
FIG. 3 is a flow chart illustrating one suitable method for providing a user an encoded physical medium in accordance with another aspect of the present invention.

Turning next to FIG. 3, a method 102 for providing a user an encoded physical medium 30 in accordance with another aspect of the present invention will be described. In a first step 200, the designer creates a representation of a physical medium 30 that will include hot spots. A "hot spot" is defined as a particular region wherein content is encoded, and may include text and/or graphics. The encoded content of the hot spot can take any of a variety of forms, dependent upon such things as the encoding scheme and the goals of the designer. For example, the encoding scheme may be such that the encoded content visually blends together with any text and graphics generated by the designer. Alternatively, the encoding scheme may result in the encoded content being visually distinctive or completely hidden from the viewer. The representation of the physical medium 30 may be created within an off-the-shelf or custom made design software system, or the representation may be a physical model. In a step 202, the designer defines the content of the hot spots. Alternatively, the designer may be provided with the content. The content of a hot spot is the information to be encoded therein, and may include computer instructions, a uniform resource locator (URL), and other data.

In a subsequent step 204, the content of each hot spot is encoded according to a particular encoding scheme. Preferably, the encoding will be automated such that the designer will simply enter the desired content and initiate the encoding process, which is in turn performed by a computer system or some other suitably programmed tool. In some embodiments, the encoding process will also introduce a marker into the encoded content indicating that certain information is encoded in the hot spots. Once the content is encoded, in a step 206 the encoded content is inserted into the appropriate locations within the representation of the physical medium 30. In a step 208, the encoded physical medium 30 is generated from its representation. For example, when the representation is created by a system such as graphic design software and the encoding scheme is a spectral encoding scheme, a printer utilizing the necessary inks can print out the encoded physical medium 30.

Figure 4:
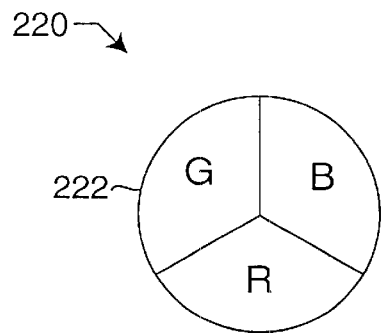
FIG. 4 is a diagrammatic illustration of a hot spot in accordance with one embodiment of the present invention.
Figure 5:
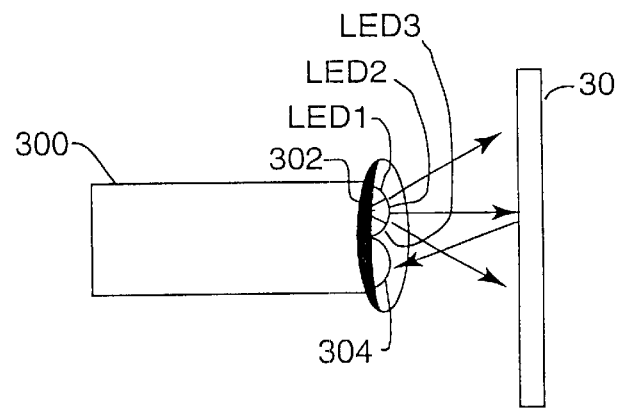
FIG. 5 illustrates a sensor responsive to a first spectral encoding scheme in accordance with yet another embodiment of the present invention.
Figure 6:
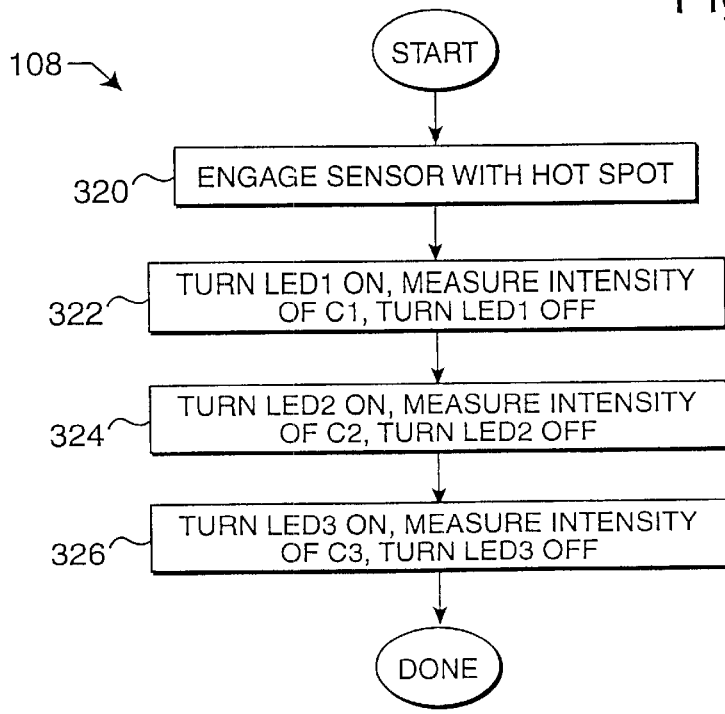
FIG. 6 is a flow chart illustrating one suitable method for measuring information encoded in a hot spot.

With reference to FIGS. 4–6, a first spectral encoding scheme according to another embodiment of the present invention will be described. The first spectral encoding scheme represents content via three different values encoded within a hot spot 220. The sensor "decodes" these values by measuring the intensities of three different encoding colors C1, C2, and C3 found within the hot spot 220. C1, C2, and C3 may, for example, correspond to red, green, and blue (RGB). Alternatively, C1, C2, and C3 may be selected from outside the visible light range (e.g., infrared colors) or may be a combination of visible and invisible colors.

As will be apparent to those skilled in the art, the hot spot 220 itself can be created using inks whose colors do not correspond directly to C1, C2, and C3. Take the instance where C1, C2, and C3 correspond to RGB. Most likely, the color printing system selected to, produce the hot spot 220 will be a "CMYK" type using cyan (C), magenta (M), yellow (Y), and black (K) inks to produce color images. In such a case, the encoded medium designer may be provided a mapping between CMYK space and the different content values, even though the sensor will be determining each content value by measuring the intensities of the three different encoding colors RGB within the hot spot 220.

FIG. 4 represents diagramattically a hot spot 220 encoded according to the first spectral encoding scheme. A pie chart 222 indicates that the different encoding colors C1, C2, and C3 are measurable in the hot spot 220, each taking on their own particular intensity. Thus the engaged sensor would measure three different values, one each for C1, C2, and C3. These values taken together provide the encoded content. FIG. 4 does not illustrate the visual appearance a hot spot would likely take on, but merely represents that the different encoding colors are measurable within the hot spot 220. Of course, depending upon the content encoded therein, each hot spot will have varying intensity levels and in some instances the intensity level of certain encoding colors would be zero. The actual visual appearance of the hot spot 220 would include any text and/or graphical illustrations that the designer has created.

FIG. 5 illustrates a sensor 300 responsive to the first spectral encoding scheme and thus operable to measure information from an encoded physical medium 30. The sensor 300 includes a light emitter 302, a sensing element 304, and a shroud 306. The light emitter 302 includes three light emitting diodes LED1, LED2, and LED3, each operable to emit light corresponding to C1, C2, and C3, respectively. The sensing element 304 is a broadband sensing element responsive to the entire light spectrum. A user engages the sensor 300 with a desired region 32 of the encoded physical medium 30 by turning the sensor 300 on and bringing the light emitter 302 and the sensing element 304 into reasonably close proximity to the desired region 32. When the sensor 300 is properly engaged with the desired region 32, the shroud 306 helps prevent the sensing element 304 from measuring extraneous information in the form of ambient light.

With reference to FIG. 6, one suitable method 108 for measuring the information stored within the desired region 32 will now be described. Simply put, the method 108 of FIG. 6 sequences through measuring the intensities of the encoding colors C1, C2, and C3. In a first step 320, the user engages the sensor 300 with the desired region 32. A step 322 turns LED1 on, measures the reflected intensity of C1, and then turns LED1 off. A step 324 turns LED2 on, measures the reflected intensity of C2, and then turns LED2 off. A step 326 turns LED3 on, measures the reflected intensity of C3, and then turns LED3 off. Typically the sensing element 304 will generate an analog voltage proportional to the light intensity and the sensor 300 will include an analog-to-digital (A/D) converter. Thus the number of content identification numbers available with the first encoding scheme is directly dependent upon the resolution of the A/D converter.

Figure 7:
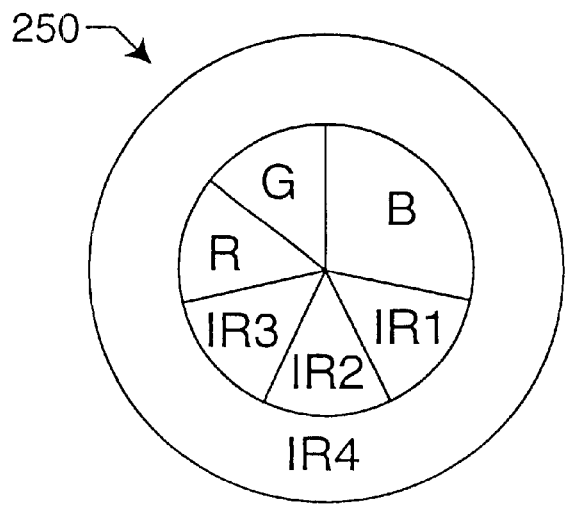
FIG. 7 is a diagrammatic illustration of a hot spot representation in accordance with one embodiment of the present invention.
Figure 8:
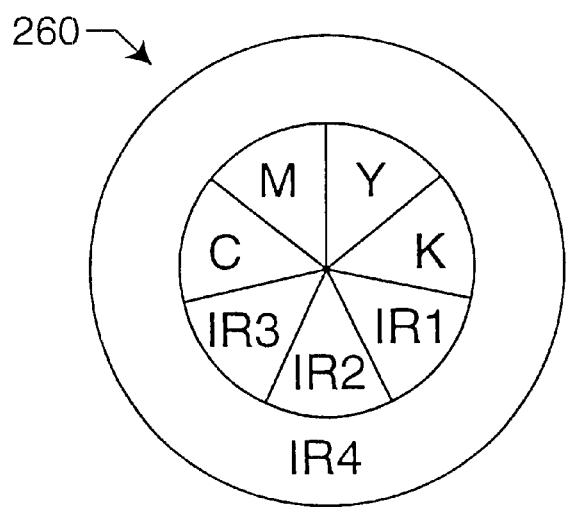
FIG. 8 is a diagrammatic illustration of a hot spot generated from the hot spot representation of FIG. 7.

With reference to FIGS. 7–8 a second spectral encoding scheme according to yet another embodiment of the present invention will be described. The second spectral encoding scheme represents content via six different values encoded within a hot spot 250. The sensor "decodes" these values by measuring the intensities of six different encoding colors. The second spectral encoding scheme also utilizes another infrared color IR4 to serve as a marker indicating that content has been encoded in the hot spots. Preferably, IR4 will be selected from among those infrared colors that do not very often arise naturally, thus decreasing the possibility of a false mark indication.

FIG. 7 represents diagramattically the hot spot representation 250 as it might be stored in a computer representation. A pie chart 252 indicates that the different colors red, blue, green, IR1, IR2, and IR3 are present in different proportions throughout the hot spot representation 250. The color IR4 is applied across the hot spot representation 250 thus marking the entire hot spot representation 250. Alternatively, the color IR4 could be applied just in a portion of the hot spot representation 250.

FIG. 8 diagramattically represents a hot spot 260 as applied to an encoded physical medium according to one embodiment of the present invention. As noted above, many color printing systems are "CMYK" type which use cyan (C), magenta (M), yellow (Y), and black (K) inks to produce color images. FIG. 5 simply illustrates that a color encoding scheme may be based upon the measurable intensities of certain colors such as RGB, yet the hot spots may be printed or created using another system such as the common CMYK color printing technique.

Figure 9:
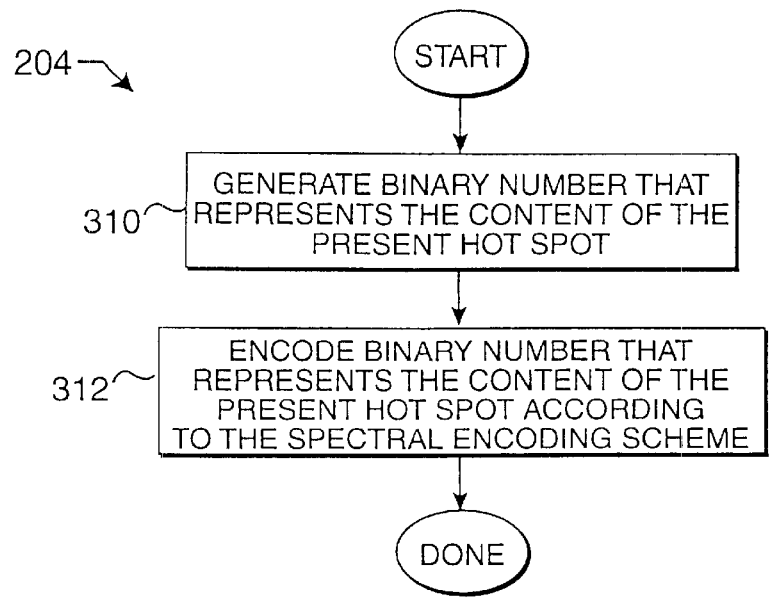
FIG. 9 is a flow chart illustrating one suitable method for performing step 204 of FIG. 3 in accordance with still another aspect of the present invention.

With reference to FIG. 9, one suitable method for performing step 204 of FIG. 3 in accordance with a spectral encoding scheme will now be described. As will be appreciated, the number of encoding colors and the sensitivity of the spectral encoding scheme to the encoding colors' intensities will determine the quantity of binary numbers available to represent content. The standard creator may choose any number of content identities less than or equal to that available with the sensor 300. In any event, each binary number (essentially a content identification number) is assigned a specific meaning or content. Then for each hot spot having content defined by step 202 of FIG. 3, in a step 310 a binary number representing the desired content of the hot spot is generated according to the predefined assignment. In a next step 312, the binary number corresponding to the desired content of the present hot spot is encoded according to the color code of the spectral encoding scheme. In some embodiments, the IR4 marker is also inserted at this point. However, in other embodiments the IR4 marker is only inserted upon generation of the encoded physical medium 30.

Figure 10:
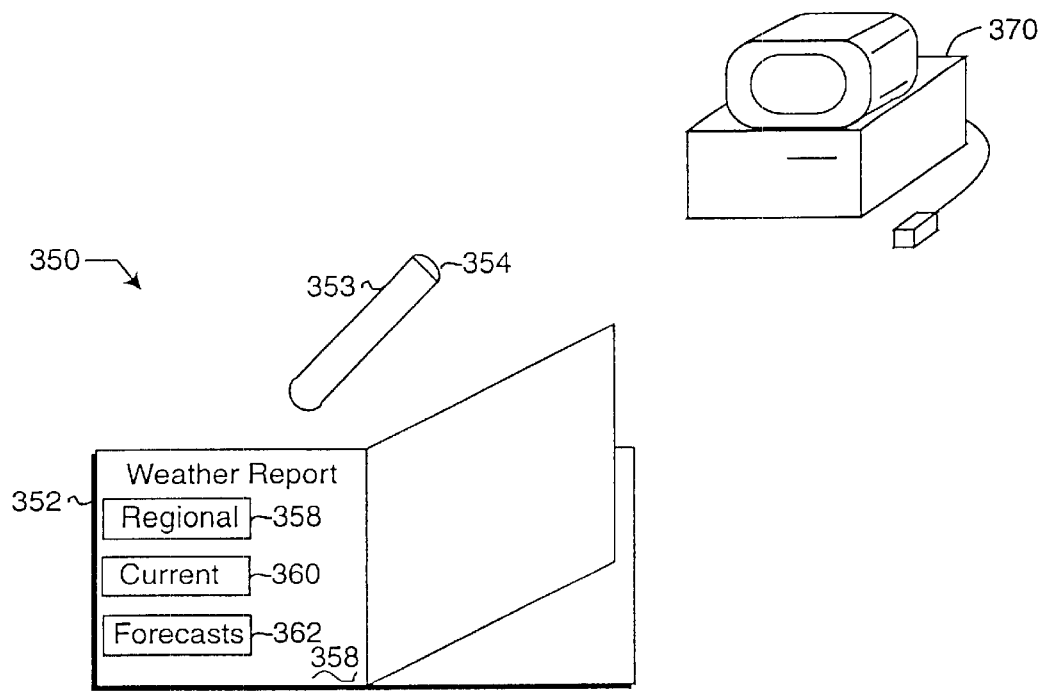
FIG. 10 is a diagrammatic illustration of a first data linked book embodiment of the present invention.

Turning next to FIG. 10, a data linked book 350 in accordance with one embodiment of the present invention will now be described. A primary purpose of the linked book 350 is to link a physical book with data such as video and audio streams available via an information network such as the Internet. The linked data is then presented (e.g., displayed, played, etc.) on an Internet device such as a WebTV or a personal computer.

The linked book 350 includes a physical book 352, a sensor 353 having an infrared transmitter 354, a plurality of pages such as page 356 and a plurality of hot spots such as hot spots 358, 360, and 362. The physical book 352 appears conventional to a viewer in that the book 352 flips open to the different pages, each of which provide meaningful information in the form of text and graphics. In the example of FIG. 10, the physical book 352 is opened to the pace 356 entitled "Weather Report." Thus the user should immediately realize that the Weather Report page 356 is electronically linked to weather report information available over the corresponding information network. in the embodiment of FIG. 10, each of the hot spots represents a uniform resource locator (URL). As will be appreciated, a URL is the addressing mechanism used by the Internet to correspond to a unique Internet address. A URL, together with any other desired information, is encoded within each hot spot according to a selected encoding scheme such as a spectral encoding or bar code scheme.

When the user engages the sensor 353 with a desired hot spot, the sensor 353 decodes the content of the hot spot, performs any necessary interpretation and other local functions, and then transmits the URL to the computer system 370. The computer system 370 then uses the URL and other received information to download the desired data from the Internet, presenting such data to the user in the proper form. For example, a video stream may be displayed on the computer screen of the computer system 370.

Figure 11:
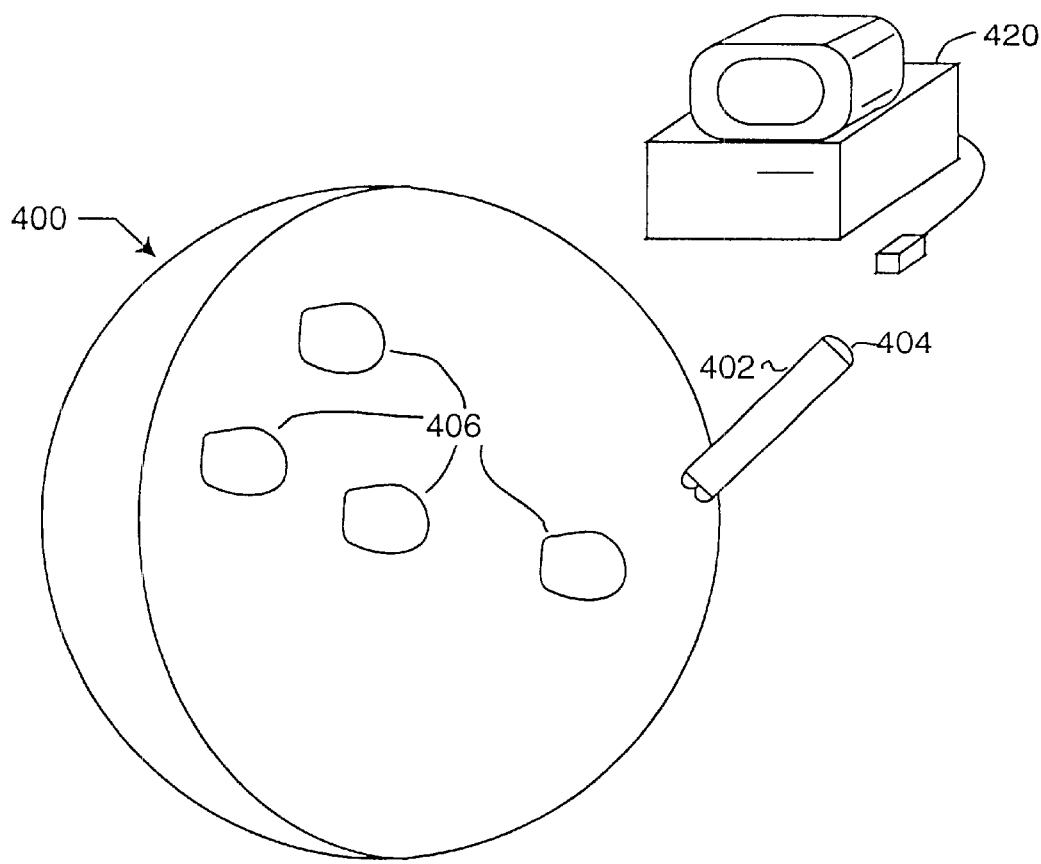
FIG. 11 is a diagrammatic illustration of a data linked globe embodiment of the present invention.

Turning next to FIG. 11, a data linked globe 400 in accordance with yet another embodiment of the present invention will now be described. The data linked globe 400 includes both a sensor 402 having an infrared transmitter 404 and a plurality of hot spots 406. The data linked globe 400 of FIG. 11 presents a spherical earth map. Encoded within the hot spots 406 are linking data. The linking data of FIG. 11 may take any of a variety of suitable forms. For example, similar to the data linked book of FIG. 11, the linking data may include a URL. Each hot spot may represent a town, region, province, country, etc. The associated URL may direct the computer system 420 to an Internet World Wide Web page produced, e.g., by the Chamber of Commerce for that town, region, etc.

In an alternative embodiment, the computer system 420 of FIG. 11 maintains a database of geographical and/or historical data regarding the region represented by the hot spot. The linking data would then instruct the computer system 420 to present the corresponding information through the appropriate media interface, e.g., audio and video. In yet another embodiment, the linking data stored in each hot spot would contain the bulk of the content, the sensor 402 simply transferring this content to the computer system 420 which would in turn present this information through the appropriate media interface.

While this invention has been described in terms of several preferred embodiments and a number of specific examples, there are alterations, permutations, and equivalents which fall within the scope of this invention.

For example, it is contemplated that in certain embodiments encoded content will be inserted onto a plurality of detachable bodies. A user provided with these may attach the bodies to a variety of different physical media. In this manner, the user is, in essence, able to configure and program his own computer interface. As will be appreciated, the attachment mechanism of the detachable bodies may take any suitable form such as magnetic stripping, tape, hook-and-pile (e.g. Velcro®) members, etc.

In another suitable embodiment, the marker 34 is a template that is positioned upon the encoded physical medium 30. The template may be configurable such that the user can select the region 32. Alternatively, the template may affix to the encoded physical medium such that the region 32 is defined by the predetermined mating of the template and the encoded physical medium 30.

As will be appreciated, the variety of physical medium upon which content may be encoded according to the present invention is almost limitless, ranging from toys to tools to industrial parts and beyond. Still further, the hot spots may be encoded regions displayed upon a computer monitor, television screen, or the like.

Likewise, the nature of content that may be encoded in the hot spots is unconstrained. The content may be abstract or concrete. A concrete example arises in the case of industrial parts where the encoding could be both machine and human readable and geared towards assisting in an automated training system. Under the training system, the worker checks the code on the part to determine the correct assembly order or obtain other information about the part. Thus, with training, the worker would need to use the sensor only when she encounters a code that she is unfamiliar with.

It is further contemplated that the sensor may take many different forms. For example, rather than a wand or portable sensing device, the sensor may be a stationary device where the encoded object is passed under or near the stationary sensor in order to cause engagement.

In one preferred embodiment the sensor 12 stores one or more unique identifiers (IDs). At least one of these IDs would be transmitted every time the sensor 12 communicates with an external system such as the computer system 40. The ID(s) can provide a variety of information such as the identity of the sensor 12 and/or the user of the sensor 12. One example use for these IDs is within the context of the computer interface 10 acting as an interface to the World Wide Web. When the user selects a particular hotspot 32 linked to a particular web page, the user ID stored in the sensor 12 is transmitted to the particular web page. This allows the particular web page to track the user's activity in a manner similar to how "cookies" are used today.

Another possibility is to make use of these IDs for electronic transactions. Here a user can make purchases utilizing the sensor 12 and their unique ID much like an ATM card. When the user accesses a transaction oriented web site through the sensor 12, the user's ID would be automatically transmitted to the web site. Once the user has selected items desired for purchase, the user must enter a PIN associated with the user ID stored in the sensor 12. Each sensor 12 may have one or more user IDs allowing use by multiple people.

Typically detailed information about the user such as name, address, credit card number, etc., will be stored external to the sensor. However, in certain cases this information can be stored within the sensor. It is contemplated that such information will be programmable by the user. For example, this may involve the user accessing a registration web site and registering their sensor together with other information. Any changes in personal information can be effected later by re-accessing the registration web site. Also, the user may be allowed to determine who has been querying their ID similar to a credit service such as TRW.

In addition to user ID, the different types of information that may be stored by the sensor IDs include sensor type, access type, language type, and user preferences. Sensor type information identifies the physical characteristics of the sensor such as number and kind of interface buttons and controls present on the sensor, sensor manufacturer, communications protocols, and other features of the sensor. Access type information defines levels of access permitted with this sensor. For example, the access type could include fields for sexual content level, violence content level, or purchasing authorization (e.g., no, purchases greater than $50.00). The language type would indicate the preferred language of the user.

In another embodiment, the sensor 12 can operate in an "off-line" mode. In this instance data such as URLs could be collected and stored in the sensor for later use or transmission. The user could select the "off-line" mode in a variety of ways. For example, pressing and holding down the sensor 12 on hot spot for a relatively long period of time, say 3–4 seconds. Later when the user is near an Internet access device, the URLs can be downloaded and instantly accessed and/or stored as bookmarks for later viewing with an Internet browser.

In another aspect related to the method of FIG. 3, a user is provided a software utility for creating her own encoded physical embodiments. This allows multiple users to create and exchange their own encoded physical mediums. The user could also personalize her stationary with encoded information, encode information onto her business cards, or mark her belongings for security purposes.

The above description of the first spectral encoding scheme of FIGS. 4–6 was based upon the assumption that the hot spots were generated utilizing reflective inks. Thus the hot spots generated light that corresponded to the encoded content simply by reflecting light emitted by the LEDs. However, in other embodiments the inks used to create the hot spots may be phospholuminescent, or the hot spots could be created with some alternative mechanism such as LEDs in order to emit the necessary light. In either case, the sensor 300 can be designed without a light emitter 302.

Another suitable encoding scheme involves the use of gray-scale coding. That is, content can be encoded within hot spots using different densities of black. In this embodiment, standard black and white printing techniques are sufficient for creating the encoded medium.

It is also contemplated that the sensor 300 of FIG. 5 may be suitably designed without a shroud 306. In some embodiments, the spectral encoding scheme tends to be insensitive to ambient light and thus the shroud 306 would be unnecessary. Additionally, the shroud 306 is removable by the user. In other embodiments, ambient light filter circuitry (or software) is included in the sensor 300 rendering the shroud 306 unnecessary. Still other embodiments of the sensor 300 include both the shroud 306 and filter circuitry. Those of skill in the art will well understand the design of shrouds and filter circuitry.

Therefore it is desired that the appended claims be interpreted as including all such alterations, permutations, and equivalents as fall within the true spirit and scope of the present invention.

What is claimed is:

1. A method for generating an encoded physical medium having a region wherein content has been encoded, the method comprising the steps of:
   receiving content that is to be encoded into a desired location on the encoded physical medium;
   encoding the content according to a particular encoding scheme suitable for application onto the encoded physical medium; and
   inserting the encoded content and a marker into a corresponding desired location within a representation of the encoded physical medium, the marker indicating that the content is encoded within the corresponding desired location,
   wherein the encoded content includes a uniform resource locator (URL).

2. A method as recited in claim 1, wherein the content includes a uniform resource locator (URL).

3. A method as recited in claim 1, wherein the URL points to a registration web site wherein the user can register.

4. A method as recited in claim 1, wherein the URL points to a transaction web site.

5. A method as recited in claim 1, wherein the content is encoded using a spectral encoding scheme.

6. A method as recited in claim 5, wherein the spectral encoding scheme visually blends together with a portion of text and graphics present on the physical medium.

7. A method as recited in claim 5, wherein the spectral encoding scheme results in the encoded content being hidden from a user of the encoded physical medium.

8. A method for generating an encoded physical medium having a region wherein content has been encoded, the method comprising the steps of:
   receiving content that is to be encoded into a desired location on the encoded physical medium;
   encoding the content according to a particular encoding scheme suitable for application onto the encoded physical medium; and
   inserting the encoded content and a marker into a corresponding desired location within a representation of the encoded physical medium, the marker indicating that the content is encoded within the corresponding desired location,
   wherein the encoded content contains a uniform resource locator (URL) and at least one of the marker and encoded content being phospoluminescent.

9. A method as recited in claim 8, wherein the URL points to a registration web site wherein the user can register.

10. A method as recited in claim 8, wherein the URL points to a transaction web site.

11. A method as recited in claim 8, wherein the marker is encoded using a spectral encoding scheme.

12. A method as recited in claim 8, wherein the encoding scheme visually blends together with a portion of text and graphics present on the physical medium.

13. A method as recited in claim 8, wherein the encoding scheme results in the encoded content being hidden from a user of the encoded physical medium.

14. A method as recited in claim 8, wherein the certain encoded information is received in an off-line mode.

15. A method as recited in claim 8, wherein the user is given feedback with respect to the encoded information.

16. A method for generating an encoded physical medium having a region wherein content has been encoded, the method comprising the steps of:

receiving content that is to be encoded into a desired location on the encoded physical medium;

encoding the content according to a particular encoding scheme suitable for application onto the encoded physical medium; and inserting the encoded content and a marker into a corresponding desired location within a representation of the encoded physical medium, the marker indicating that the content is encoded within the corresponding desired location, wherein at least one of the marker and encoded content is phospoluminescent.

17. The method as recited in claim 16, wherein the encoded content contains a uniform resource locator (URL).

18. The method as recited in claim 17, wherein the encoded content points to a transaction web site.

19. The method as recited in claim 16, wherein the spectral encoding scheme visually blends together with a portion of text and graphics present on the physical medium.

* * * * *